(12) United States Patent
Bian et al.

(10) Patent No.: US 12,222,043 B2
(45) Date of Patent: Feb. 11, 2025

(54) ELECTRIC VALVE

(71) Applicant: ZHEJIANG SANHUA AUTOMOTIVE COMPONENTS CO., LTD., Zhejiang (CN)

(72) Inventors: Qikai Bian, Zhejiang (CN); Yangjun Zhao, Zhejiang (CN); Haitao Chen, Zhejiang (CN)

(73) Assignee: ZHEJIANG SANHUA AUTOMOTIVE COMPONENTS CO., LTD., Zhejiang (CN)

( * ) Notice: Subject to any disclaimer, the term of this patent is extended or adjusted under 35 U.S.C. 154(b) by 8 days.

(21) Appl. No.: 18/281,742

(22) PCT Filed: Mar. 11, 2022

(86) PCT No.: PCT/CN2022/080309
§ 371 (c)(1),
(2) Date: Sep. 12, 2023

(87) PCT Pub. No.: WO2022/188857
PCT Pub. Date: Sep. 15, 2022

(65) Prior Publication Data
US 2024/0159326 A1 May 16, 2024

(30) Foreign Application Priority Data

Mar. 12, 2021 (CN) .......................... 202110270941.7

(51) Int. Cl.
*F16K 31/04* (2006.01)
*F16K 5/06* (2006.01)
(Continued)

(52) U.S. Cl.
CPC .......... *F16K 31/043* (2013.01); *F16K 5/0647* (2013.01); *F16K 27/067* (2013.01); *F16K 31/041* (2013.01); *F16K 31/535* (2013.01)

(58) Field of Classification Search
CPC .... F16K 31/043; F16K 27/067; F16K 31/041; F16K 5/0647; F16K 31/535; F16K 5/06; F16K 5/0663; Y02B 30/70
See application file for complete search history.

(56) References Cited

U.S. PATENT DOCUMENTS

| 7,758,013 B2* | 7/2010 | Arai | ........................ | F16K 31/53 |
| | | | | 251/85 |
| 8,408,518 B2* | 4/2013 | Schade | ................... | F16K 31/53 |
| | | | | 251/83 |

(Continued)

FOREIGN PATENT DOCUMENTS

| CN | 111350844 A | 6/2020 |
| CN | 210739507 U | 6/2020 |

(Continued)

OTHER PUBLICATIONS

International Search Report for PCT/CN2022/080309 mailed Apr. 24, 2022, ISA/CN.

*Primary Examiner* — John Bastianelli
(74) *Attorney, Agent, or Firm* — Yue (Robert) Xu; Apex Attorneys at Law, LLP

(57) ABSTRACT

An electric valve. The electric valve is provided with a channel, part of the channel is located between a connecting seat and a fixed gear ring, part of the channel is located in the connecting seat, and by means of the channel, a sleeve cavity and a valve body cavity are in communication with each other.

19 Claims, 9 Drawing Sheets

(51) Int. Cl.
*F16K 27/06* (2006.01)
*F16K 31/53* (2006.01)

(56) References Cited

U.S. PATENT DOCUMENTS

| | | | |
|---|---|---|---|
| 8,794,591 B2 * | 8/2014 | Arai | F01L 1/352 |
| | | | 251/248 |
| 2020/0386340 A1 * | 12/2020 | Lv | F16K 31/53 |
| 2021/0164576 A1 * | 6/2021 | Cheng | F16K 11/0873 |
| 2022/0228671 A1 | 7/2022 | Wu et al. | |

FOREIGN PATENT DOCUMENTS

| | | |
|---|---|---|
| CN | 211738083 U | 10/2020 |
| JP | 2009228765 A | 10/2009 |
| JP | 2013249847 A | 12/2013 |
| WO | 2020253480 A1 | 12/2020 |

\* cited by examiner

ELECTRIC VALVE

This disclosure is a national phase application of PCT international patent application PCT/CN2022/080309 filed on Mar. 11, 2022 which claims the priority of the Chinese Patent Disclosure No. 202110270941.7, titled "ELECTRIC VALVE", filed on Mar. 12, 2021 with the China National Intellectual Property Administration, which are incorporated herein by reference in its entirety

FIELD

The present disclosure relates to an electric valve.

BACKGROUND

An electric valve includes a control device, a valve component, a valve core and a valve body assembly, where the valve component includes a transmission mechanism, and the specific transmission component can be a planetary gear structure. The control device drives the valve core of the electric valve to move by the transmission mechanism so as to achieve the purpose of fluid blocking/communication. It may appear for the transmission mechanism, after running for a period of time, that powder impurities are produced and accumulated in an inner chamber of the electric valve, which is not conducive to the normal operation of the electric valve. How to reduce the accumulation of powder impurities in the inner chamber of the electric valve is a technical problem needed to be improved.

SUMMARY

An object of the present disclosure is to provide an electric valve which is conducive to reducing powder impurities accumulating in an inner chamber of the electric valve.

In order to achieve the above object, the following technical solution is provided according to the present disclosure:

An electric valve includes a valve member, a valve body assembly and a valve core, where the valve member includes a sleeve, a transmission mechanism and a connecting seat. The sleeve is provided with a sleeve chamber, in which the transmission mechanism is at least partially arranged, and the sleeve is connected with the connecting seat. A valve body chamber is formed in the valve body assembly, in which the valve core is arranged, and the valve core is in transmission connection with the transmission mechanism. The valve body assembly is connected with the connecting seat. The transmission mechanism includes a ring gear and a planetary gear set, where the planetary gear set is at least partially arranged inside the ring gear. The connecting seat is provided with an accommodating chamber, in which the ring gear is at least partially arranged, and part of the ring gear abuts against the connecting seat. The electric valve is provided with a passage, part of which is arranged between the connecting seat and the ring gear and part of which is arranged at the connecting seat, and the passage can communicate the sleeve chamber and the valve body chamber.

According to the present disclosure, with the configuration of the passage communicating the sleeve chamber and the valve body chamber, powder impurities accumulated in the sleeve chamber can flow into the valve body chamber through the passage, and by controlling the electric valve to be in communication with system pipeline/component, the powder impurities entering the valve body chamber can enter the system pipeline/component, which is beneficial to reducing the accumulation of powder impurities in the electric valve, improving the operating state of the electric valve and prolonging the service life.

DETAILED DESCRIPTION OF THE EMBODIMENTS

Figure 1:
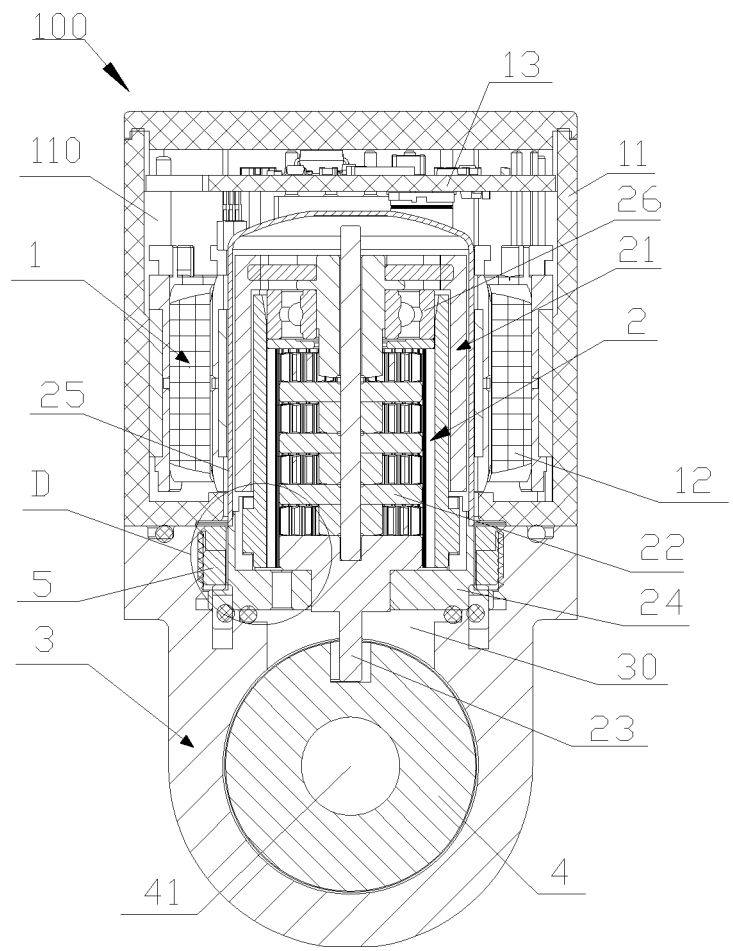
FIG. 1 is a schematic cross-sectional structural view of a first embodiment of an electric valve.

The present disclosure will be further described as follows in conjunction with the drawings and specific embodiments.

Referring to FIG. 1 to FIG. 10, an electric valve can be applied to a vehicle thermal management system or an air conditioning system. The electric valve 100 includes a control member 1, a valve member 2, a valve body assembly 3 and a valve core 4, where the valve body assembly 3 has a valve body chamber 30, in which the valve core 4 is arranged, and the valve core 4 is in transmission connection with the valve member 2. The control member 1 is arranged at an outer periphery of the valve member 2, and the control member 1 is fixedly or limitedly connected with the valve body assembly 3. The electric valve 100 is electrically connected and/or in a signal connection with the outside through the control member 1.

Figure 2:
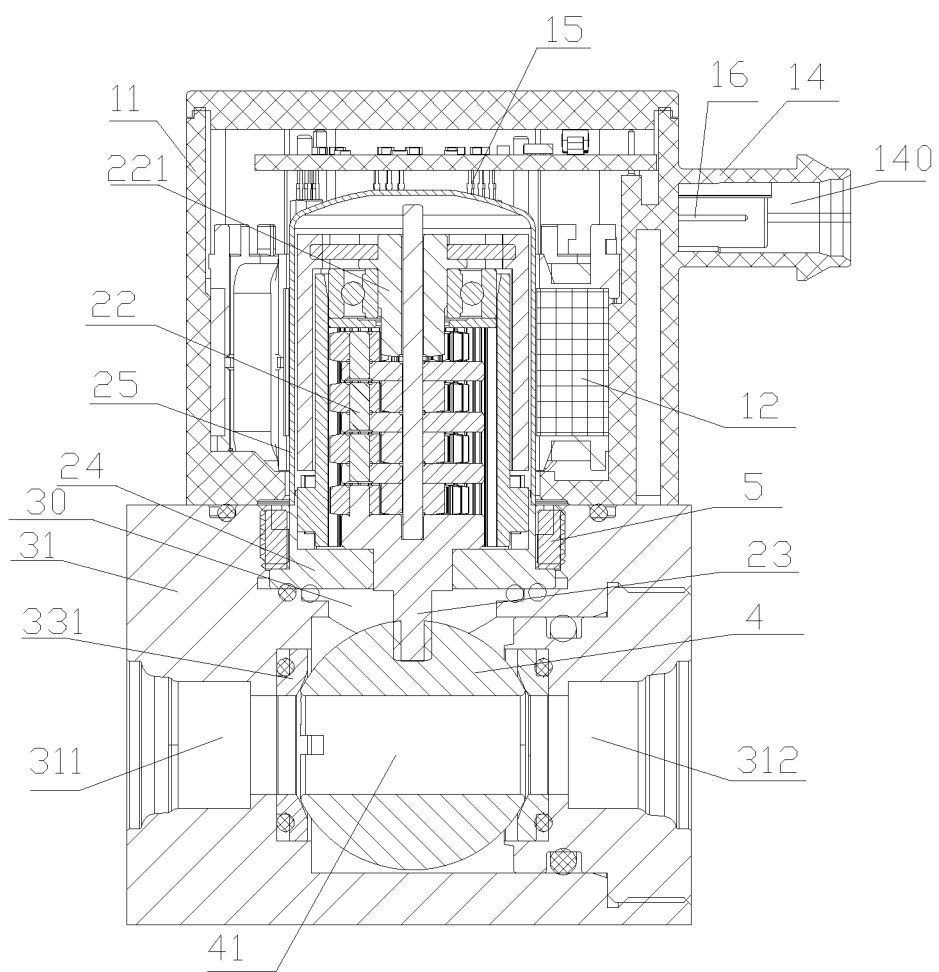
FIG. 2 is another schematic cross-sectional structural view of the first embodiment of the electric valve.

Referring to FIG. 1 and FIG. 2, in this embodiment, the control member 1 includes an outer housing 11, a stator assembly 12, a circuit board 13, an interface part 14, a first pin 15, and a second pin 16. The outer housing 11 can be formed with the interface part 14 by injection molding or can be connected with the interface part 14 by assembly, and the outer housing 11 is formed with a housing chamber 110, in which both the stator assembly 12 and the circuit board 13 are arranged. One end of the first pin 15 is electrically connected and/or in a signal connection with the stator assembly 12, the other end of the first pin 15 is electrically connected and/or in a signal connection with the circuit board 13, and the second pin 16 is fixedly connected with the interface part 14. Specifically, in this embodiment, the outer housing 11 and the interface part 14 can be formed by injection molding with the second pin 16 as an injection molding insert, and one end of the second pin 16 is arranged in the housing chamber 110 for electrical and/or signal connection with the circuit board 13, and the other end of the second pin 16 is arranged in a socket chamber 140 formed by the interface part 14 for electrical and/or signal connection with the outside. In this embodiment, the control member 1 is connected and fixed to the valve body assembly 3 by screws. Of course, in other embodiments, the control member 1 can also be connected and fixed to the valve body assembly 3 by welding, gluing or snapping. Further, the control member 1 can be arranged to be sealed with the valve body assembly 3, which on the one hand is beneficial to prevent water vapor or other impurities in the outside air from entering the housing chamber 110 through an assembly gap between the control member 1 and the valve body assembly 3 to contact with the stator assembly 12, resulting in corrosion or failure of the stator assembly 12, and on the other hand is beneficial to prevent water vapor or other impurities in the outside air from entering the valve body chamber 30 through the assembly gap between the control member 1 and the valve body assembly 3.

Figure 3:
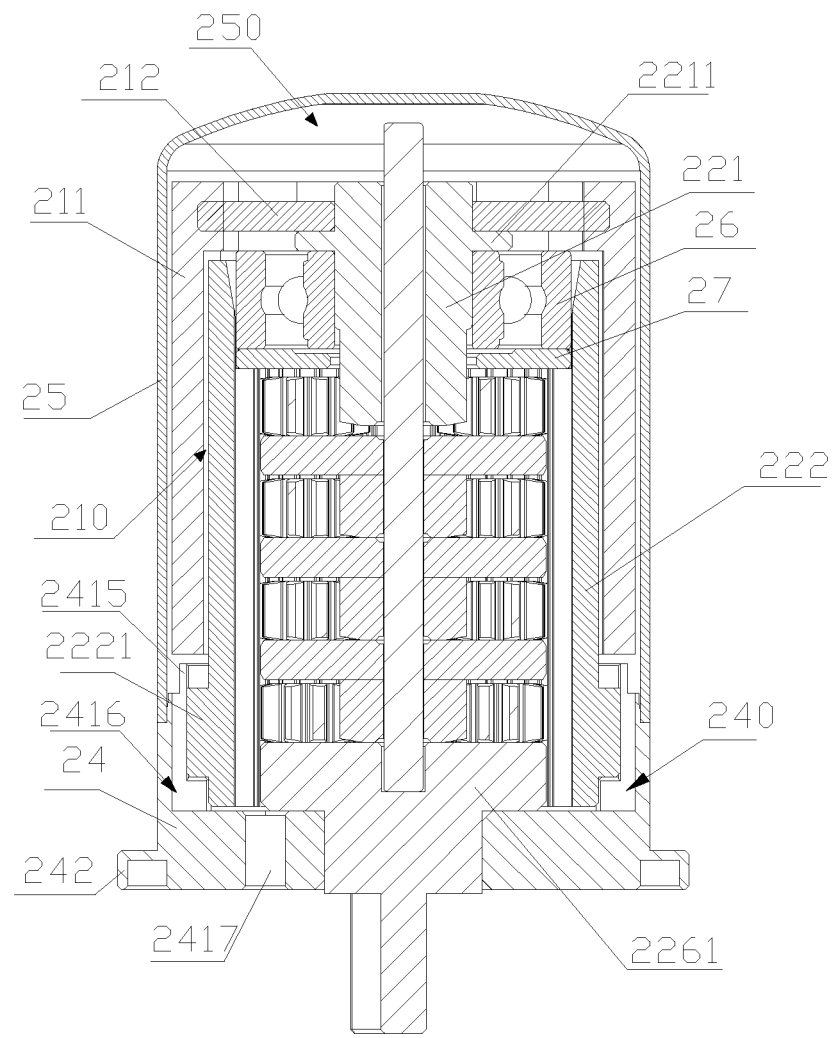
FIG. 3 is a schematic cross-sectional structural view of a valve component shown in FIG. 1.

Referring to FIG. 1 to FIG. 3, the valve member 2 includes a rotor assembly 21, a transmission mechanism 22, a valve rod 23, a connecting seat 24 and a sleeve 25. The sleeve 25 has a sleeve chamber 250, in which the rotor assembly 21 is arranged, and the sleeve 25 is fixedly connected with the connecting seat 24. In this embodiment, the sleeve 25 is fixedly connected with the connecting seat 24 by welding. The rotor assembly 21 has a rotor chamber 210, and the connecting seat 24 has an accommodating chamber 240. Part of the transmission mechanism 22 is arranged in the rotor chamber 210 and part of the transmission mechanism 22 is arranged in the accommodating chamber 240. The transmission mechanism 22 is in transmission connection with the valve rod 23 that is in transmission connection with the valve core 4. In this embodiment, the valve core 4 includes a spherical surface or a spherical-like surface. Of course, in other embodiments, the valve core 4 may be in other shapes, such as cylinder, frustum, cone, needle and the like. Part of the transmission mechanism 22 is arranged in the rotor chamber 210, which is beneficial to reduce axial height of the electric valve 100. In this embodiment, the transmission mechanism 22 is a planetary gear mechanism. Of course, in other embodiments, the transmission mechanism 22 is not limited to the planetary gear mechanism.

Figure 4:
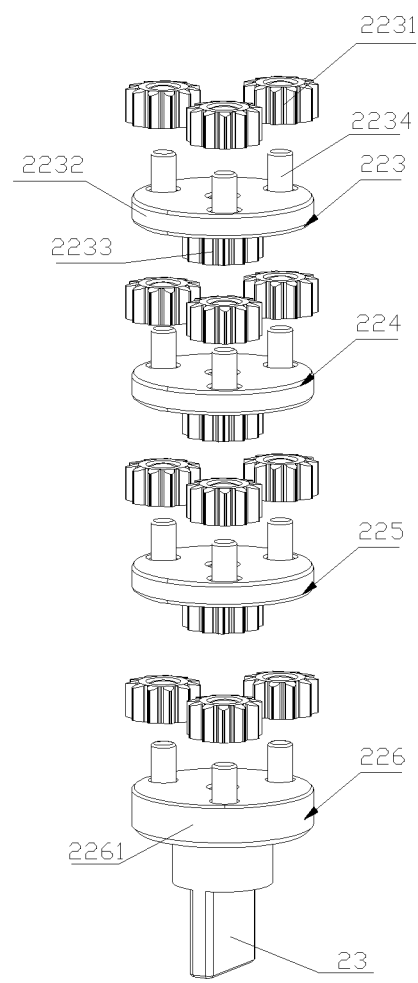
FIG. 4 is a schematic exploded structural view of a planetary gear set at all stages shown in FIG. 1.

Referring to FIG. 3 and FIG. 4, the rotor assembly 21 includes a rotor magnetic ring 211 and a connecting plate 212. The rotor assembly 21 is formed by injection molding of the rotor magnetic ring 211 with the connecting plate 212 as an injection molding insert. The transmission mechanism 22 includes a sun gear 221, and the connecting plate 212 is fixedly connected with the sun gear 221. Of course, in other embodiments, the connecting plate 212 and the sun gear 221 can also be formed by injection molding. The transmission mechanism 22 further includes a ring gear 222 and at least one-stage planetary gear set, where the ring gear 222 is provided with internal teeth 2223 that are formed to be protruded inward along a radial direction of the ring gear 222. The transmission mechanism 22 can be provided with multi-stage planetary gear set based on required transmission ratio, for example, in this embodiment, the transmission mechanism 22 includes a first planetary gear set 223, a second planetary gear set 224, a third planetary gear set 225 and an output planetary gear set 226 in sequence along an axial direction of the transmission mechanism 22. The ring gear 222 is arranged at an outer periphery of the planetary gear set, where part of the ring gear 222 is arranged in the rotor chamber 210, and part of the ring gear 222 is arranged in the accommodating chamber 240, and the ring gear 222 abuts against the connecting seat 24. Since the first planetary gear set 223, the second planetary gear set 224 and the third planetary gear set 225 have same structure, the first planetary gear set 223 will be taken as an example to be described. The first planetary gear set 223 includes a first planetary gear 2231, a first planetary carrier 2232 and a first column gear 2233, where the first planetary carrier 2232 and the first column gear 2233 can be formed by injection molding or assembled and fixed. In this embodiment, the first planetary carrier 2232 and the first column gear 2233 can be formed by injection molding. The first planetary gear set 223 further includes a first positioning shaft 2234, and the number of the first positioning shaft 2234 is equal to that of the first planetary gear 2231. In this embodiment, the number of the first positioning shaft 2234 and the first planetary gear 2231 each is three, and the first positioning shafts 2234 are even distributed along the outer periphery of the first planetary carrier 2232, and the first positioning shafts 2234 and the first planetary carrier 2232 can be formed by injection molding or be fixed and assembled. The first planetary gear 2231 is arranged outside the outer periphery of the first positioning shaft 2234, and is rotatably arranged on the first planetary carrier 2232 by the first positioning shaft 2234. The first planetary gear 2231 is meshed with the sun gear 221, and the first planetary gear 2231 is further meshed with the internal teeth 2223 of the ring gear 222. In order to prevent the first planetary gear 2231 from moving along the axial direction of the first positioning shaft 2234 when the first planetary gear 2231 is rotating, in this embodiment, the valve member 2 further includes a bearing 26 and a gasket 27, where the bearing 26 is arranged at the outer periphery of the sun gear 221 and is in a transition fit with the sun gear 221, and the gasket 27 is arranged at the outer periphery of sun gear 221 and can be in a clearance fit with the sun gear 221. The sun gear 221 includes a convex part 2211, and the bearing 26 is arranged between the convex part 2211 and the gasket 27 along the axial direction of the sun gear 221, where one end of the bearing 26 abuts against the convex part 2211, and the other end of the bearing 26 abuts against the gasket 27. The ring gear 222 includes a third step part 2224, which is arranged above the first planetary gear 2231, and the gasket 27 is arranged above and abuts against the third step part 2224, so that the first planetary gear 2231 can be axially limited by the gasket 27 and the first planetary carrier 2232. In addition, with the arrangement of the bearing 26, it is also beneficial to ensure the coaxiality of the sun gear 221 and the ring gear 222.

Similarly, the second planetary gear set 224 includes a second planetary gear, a second planetary carrier, a second column gear and a second positioning shaft, where the second planetary gear is arranged at the outer periphery of the second positioning shaft, meshed with the first column gear and with the ring gear 222, and axially limited by the first planetary carrier and the second planetary carrier. The third planetary gear set 225 includes a third planetary gear, a third planetary carrier, a third column gear and a third positioning shaft, where the third planetary gear is arranged at the outer periphery of the third positioning shaft, meshed with the second column gear and with the ring gear 222, and axially limited by the second planetary carrier and the third planetary carrier. The output planetary gear set 226 includes a fourth planetary gear, a fourth positioning shaft and an output planetary gear carrier 2261. The output planetary gear carrier 2261 is in transmission connection with the valve rod 23 by injection molding or assembly and fixation. In this embodiment, the valve rod 23 and the output planetary gear carrier 2261 are formed by injection molding. The fourth planetary gear is arranged at the outer periphery of the fourth positioning shaft, meshed with the third column gear and with the ring gear, and axially limited by the third planetary carrier and the output planetary carrier. It should be noted that the transmission mechanism 22 can be a made of plastic or metal material. In this embodiment, the transmission mechanism 22 is made of metal material, and components of the transmission mechanism 22 can be formed by powder metallurgy materials by injection molding, so that all of the components of the transmission mechanism 22 have good wear resistance.

Referring to FIG. 1 and FIG. 2, the valve body assembly 3 includes a valve body 31, a first flow passage 311 and a second flow passage 312. The valve body 31 has a valve body chamber 30, in which a valve core 4 is arranged. The valve member 2 is in transmission connection with the valve core 4 by the valve rod 23 and is fixedly connected to the valve body 31. Specifically, in this embodiment, the valve member 2 is fixedly connected with the valve body 31 by a compression nut 5. Of course, in other embodiments, the valve member 2 can also be fixedly connected with the valve body 31 by welding or gluing or threaded connection or the like. Further, a sealing arrangement can be arranged between the valve member 2 and the valve body assembly 3, which can prevent the fluid from leaking from the assembly gap between the valve member 2 and the valve body assembly 3. The valve core 4 has a pore passage 41 running through the valve core 4, and the pore passage 41 is configured to communicate or not communicate the first flow passage 311 with the second flow passage 312 by rotating the valve core 4, that is, the electric valve 100 can control fluid to be blocked or in communication by rotating the valve core 4. In this embodiment, the electric valve 100 is a two-way valve, but of course, in other embodiments, the electric valve can also be a three-way valve, a four-way valve or other multi-way valve.

The working principle of the electric valve 100 is as follows: after the control member 1 is powered on, the stator assembly 12 generates an excitation magnetic field, and the rotor assembly 21 drives the sun gear 221 to rotate under the excitation of the magnetic force. The sun gear 221 meshes with the first planetary gear 2231, which further meshes with the ring gear 222, and the ring gear 222 is fixedly arranged, and thus the first planetary gear 2231 rotates and at the same time drives the first planetary carrier 2232 to rotate through the first positioning shaft 2234. The rotation of the first planetary carrier 2232 in turn drives the first column gear 2233, which is meshed with the second planetary gear, to rotate, and the second planetary gear is meshed with the ring gear 222. That is, under the action of the first column gear 2233, the second planetary gear drives the second planetary carrier to rotate through the second positioning shaft. The second planetary carrier drives the second column gear, which is further meshed with the third planetary gear, to rotate, and the third planetary gear is meshed with the ring gear 222, and so on. Finally, the fourth planetary gear drives the output planetary carrier 2261 to rotate through the fourth positioning shaft. The output planetary carrier 2261 is formed with the valve rod 23 by injection molding and in turn drives the valve rod 23 to rotate. The valve rod 23 is in transmission connection with the valve core 4, and the rotation of the valve rod 23 drives the valve core 4 to rotate. With the rotation of the valve core 4, the pore passage 41 of the valve core 4 can communicate or block the first flow passage 311 with the second flow passage 312, thus realizing the block or communication of the fluid controlled by the electric valve 100.

Figure 7:
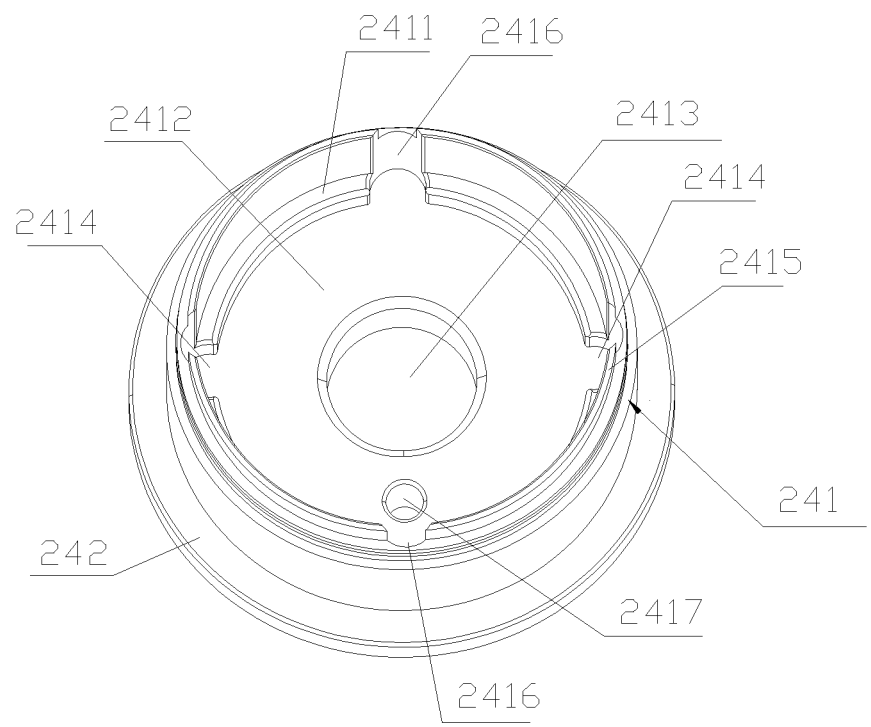
FIG. 7 is a schematic perspective structural view of a connecting seat shown in FIG. 1 from one perspective.
Figure 8:
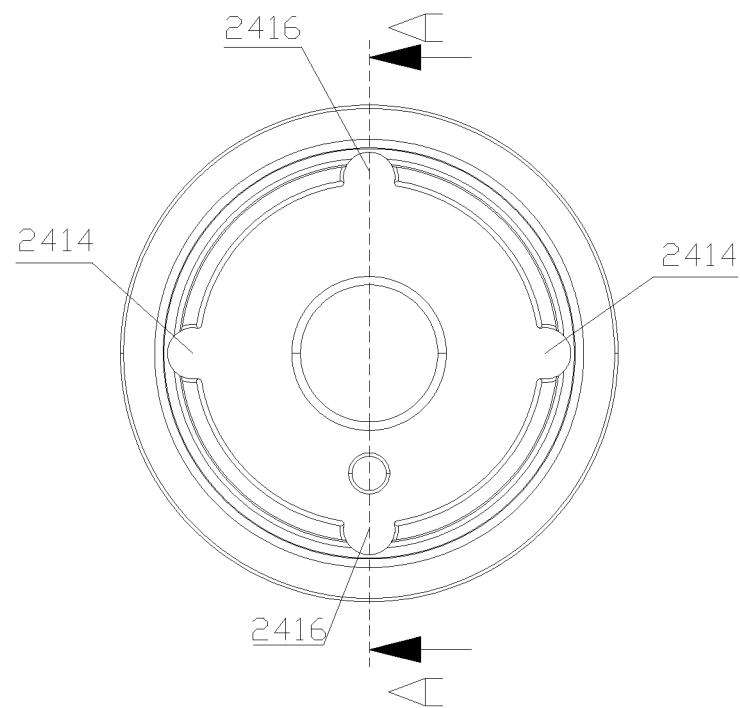
FIG. 8 is a schematic structural top view of the connecting seat shown in FIG. 7.
Figure 9:
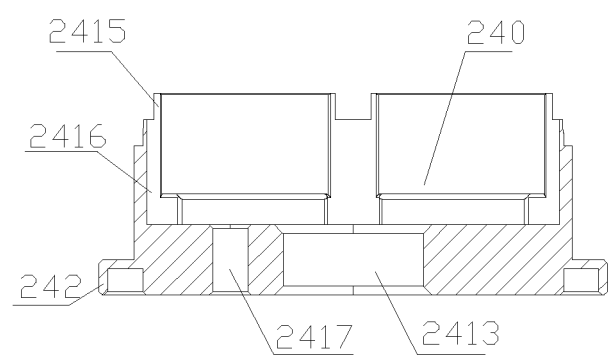
FIG. 9 is a schematic cross-sectional structural view of the connecting seat taken along A-A shown in FIG. 8.

As shown in FIG. 7 to FIG. 9, the connecting seat 24 includes a main body part 241 and a second flange part 242, which extends outward from the outer periphery of the side wall of the main body part 241 in the radial direction. The compression nut 5 is sleeved on the radial outer periphery of the side wall of the main body part 241 of the connecting seat, abuts against the upper surface of the second flange part 242, and is screwed with the valve body 31, so that the connecting seat 24 is fixedly connected with the valve body 31. The main body part 241 is formed with an accommodating chamber 240 and has a through hole 2413 as an opening of the accommodating chamber 240. The through hole 2413 is axially arranged in the center of the main body part 241, and the main body part 241 includes a first step part 2411 and a second step part 2412, where the second step part 2412 is arranged closer to the valve core 4 than the first step part 2411 along the axial direction of the connecting seat 24. The main body part 241 further has a positioning part 2414 arranged above the second step part 2412. The number of the positioning part 2414 may be one or two or more, and in this embodiment, the number of the positioning part is two, and the two positioning parts 2414 are symmetrically arranged about the axis of the connecting seat 24. The connecting seat 24 further includes a crimping part 2415, which is arranged at the upper end of the main body part 241 and used for fixed connection with the ring gear 222. The connecting seat 24 can be made of metal material, for example, the required structure and shape can be obtained by stainless steel through cutting.

Figure 5:
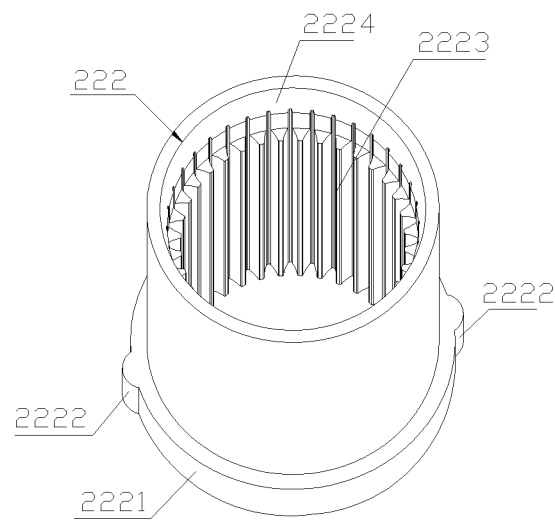
FIG. 5 is a schematic perspective structural view of a ring gear shown in FIG. 1 from one perspective.
Figure 6:
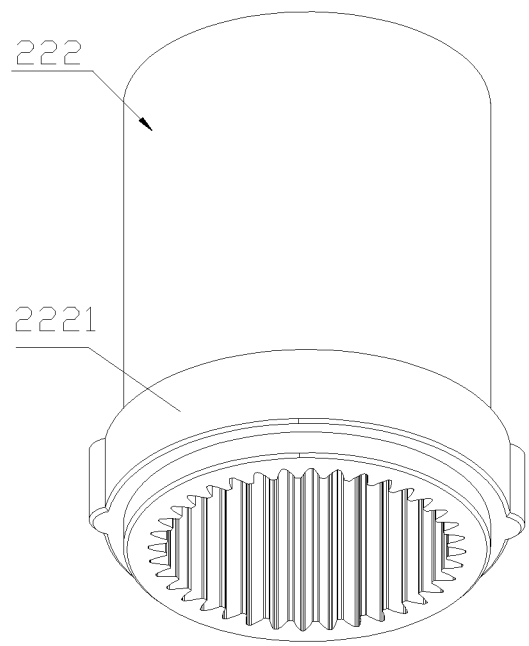
FIG. 6 is schematic perspective structural view of the ring gear shown in FIG. 1 from another perspective.

As shown in FIG. 5 and FIG. 6, the ring gear 222 has a first flange part 2221. The first flange part 2221 is arranged at one end, which is closed to the valve body 31, of the ring gear 222 and extends outward from the outer peripheral wall of the ring gear 222 in the radial direction. The ring gear 222 further has a matching part 2222 that fits with the positioning part 2414, and the matching part 2222 is formed by protruding from the outer periphery of the first flange part 2221. In this embodiment, the positioning part 2414 of the connecting seat 24 is a semi-cylindrical concave part, and correspondingly, the matching part 2222 is a semi-cylindrical protrusion fitting with the concave part. It can be understood that shape of each of the positioning part 2414 and the matching part 2222 is not limited to the semi-cylindrical shape shown in the drawing, but also can be triangular, rectangular and other shape, and the positioning part 2414 can also be a convex part and the corresponding mating part 2222 can be a concave part.

Figure 10:
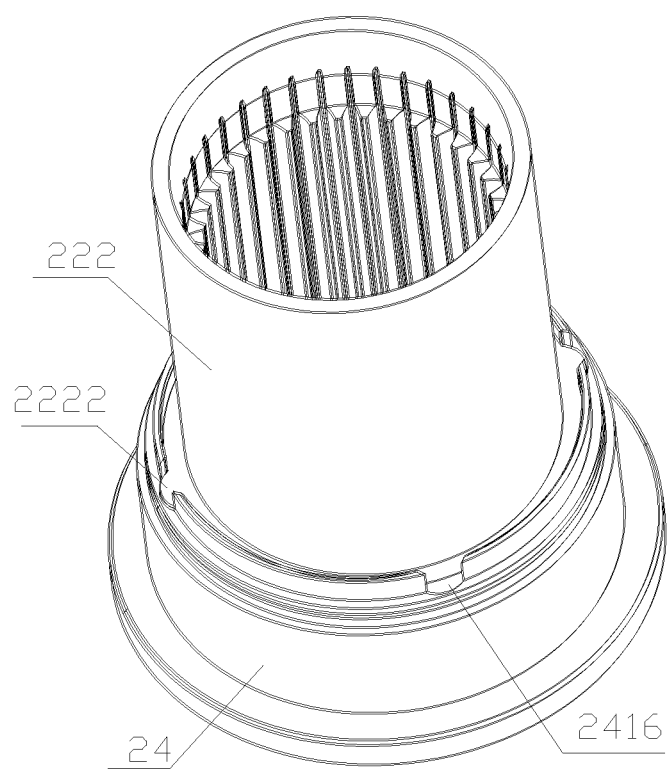
FIG. 10 is a schematic perspective structural view of the connecting seat fitted with the ring gear.

Referring to FIG. 10, FIG. 10 is a schematic structural view of the connecting seat 24 fitted with the ring gear 222. The ring gear 222 is fixedly connected with the connecting seat 24. During assembly, the ring gear 222 is first pressed into the connecting seat 24 from top to bottom, so that the lower surface of the first flange part 2221 of the ring gear 222 abuts against the first step part 2411, and the outer peripheral surface of the first flange part 2221 abuts against the inner periphery of the side wall of the main body part 241 of the connecting seat. The matching part 2222 of the ring gear 222 fits with the positioning part 2414 of the connecting seat 24, and then the crimping part 2415 of the connecting seat 24 is fixed to the ring gear 222 by a crimping way. Of course, in other embodiments, the ring gear 222 can also be fixedly connected with the connecting seat 24 by welding or gluing or the like. The output planetary carrier 2261, formed with the valve rod 23 by injection molding, partially passes through the through hole 2413 and is connected with the valve core 4, and part of the output planetary carrier 2261 abuts against the second step part 2412, through which the output planetary carrier 2261 is axially limited and supported, and there is a certain gap between the lower end face of the ring gear 222 and the upper end face of the second step part 2412.

During the operation of the electric valve, the transmission mechanism 22 will generate some powder impurities due to friction losses between the sun gear 221 and the planetary gear set, between the planetary gear set and the planetary gear set, and between the planetary gear set and the ring gear 222. The powder impurities may accumulate in the sleeve chamber 250 arranged at the outer periphery of the ring gear 222, the lower end of the rotor magnetic ring 211 and the upper end of the connecting seat 24, or even be adsorbed on the surface of the rotor magnetic ring 211, increasing the friction resistance between the rotor assembly 21 and the sleeve 25, which is not conducive to the normal operation of the electric valve. Therefore, the electric valve of this embodiment includes a passage which communicates the sleeve chamber 250 with the valve body chamber 310. Specifically, the connecting seat 24 further has a communicating part 2416, which is axially arranged along the inner peripheral wall of the main body part 241. The wall thickness of the main body part, where the communicating part 2416 is arranged, is less than that where the communicating part is not arranged, so there is a gap between the outer peripheral surface of the first flange part 2221 of the ring gear 222 and the inner peripheral wall of the main body 241 of the connecting seat at the position where the communicating part 2416 is arranged. The lower end face of the communicating part 2416 is arranged below the lower end face of the ring gear 222, which is arranged below the upper surface of the first step part 2411 or abuts against the upper surface of the first step part 2411, thus the lower end face of the communicating part 2416 is arranged below the upper surface of the first step part 2411, and the first step part 2411 is no longer a closed circular step due to the existence of the communicating part 2416. The number of the communicating part 2416 may be one or two or more. The connecting seat 24 further has a communicating hole 2417, which is arranged in the axial direction and penetrates through the second step part 2412. The communicating hole 2417 is at least partially arranged outside the output planetary carrier 2261, so that the output planetary carrier 2261 does not completely cover the communicating hole 2417, resulting in the communicating hole 2417 cannot perform the function of communication. The number of communicating hole 2417 may be one or more.

Figure 11:
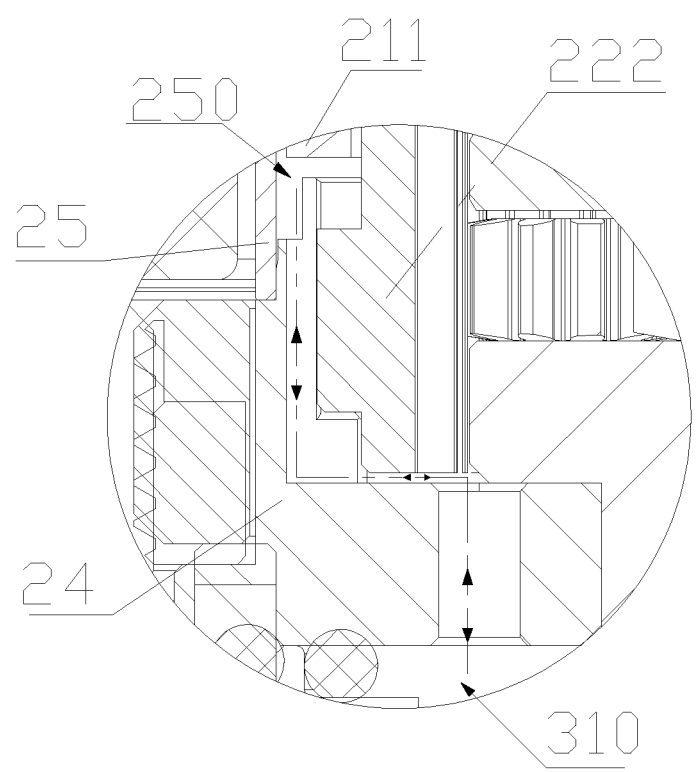
FIG. 11 is a partial enlarged view at portion D in FIG. 1.

Since there is a gap between the outer peripheral surface of the first flange part 2221 of the ring gear 222 and the inner peripheral wall of the main body part 241 of the connecting seat at the communicating part 2416, and the lower end face of the communicating part 2416 is arranged below the lower end face of the ring gear 222, and there is a certain gap between the lower end face of the ring gear 222 and the upper end face of the second step part 2412, and thus the communicating part 2416 can be in communication with the communicating hole 2417 through the gap between the lower end face of the ring gear 222 and the second step part 2412. The passage includes a communicating part 2416, a gap between the lower end face of the ring gear 222 and the second step part 2412, and a communicating hole 2417. Referring to FIG. 11, the passage communicates the sleeve chamber 250, which is arranged at the outer periphery of the ring gear 222 and at the lower end of the rotor magnetic ring 211 and the upper end of the connecting seat 24, with the valve body chamber 310 where the valve core 4 is arranged, and the sleeve chamber 250 is in communication with the rotor chamber 210, and thus the powder impurities accumulated in the sleeve chamber 250 can enter the rotor chamber 210 and the valve body chamber 310 through the passage. Especially when the electric valve is turned on or off, under the action of pressure difference, powder impurities can be moved upward into the rotor chamber 210 or downward into the valve body chamber 310 through the passage. Through the fit clearance between the valve core 4 and the valve core seat 331, the powder impurities in the valve body chamber 310 can enter the pore passage 41 of the valve core 4, the first flow passage 311 and the second flow passage 312 in communication with the pore passage 41, and can enter the system pipeline or components connected with the electric valve through the first flow passage 311 and the second flow passage 312, which is beneficial to reducing the accumulation of powder impurities and prolonging the service life of the electric valve.

Figure 12:
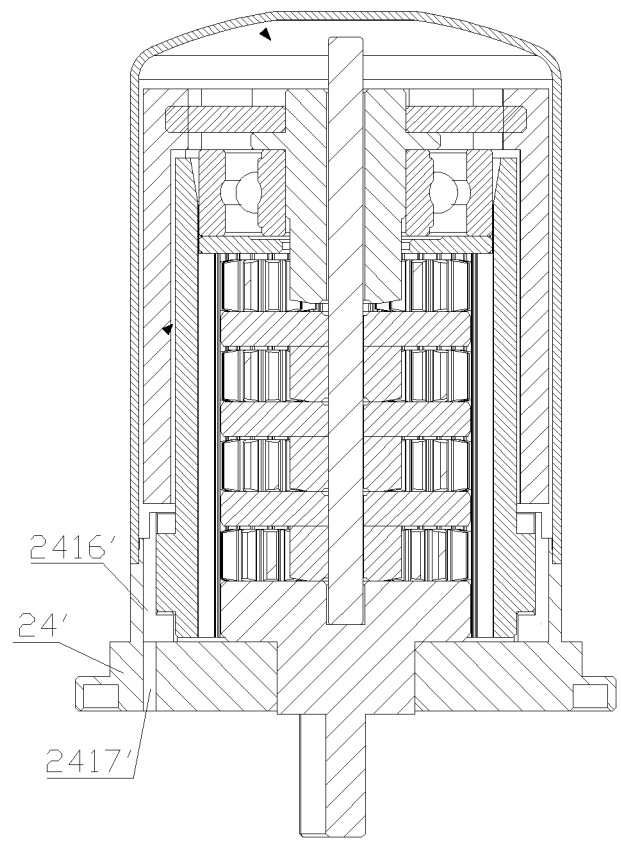
FIG. 12 is a schematic cross-sectional structural view of a second embodiment of an electric valve.
Figure 13:
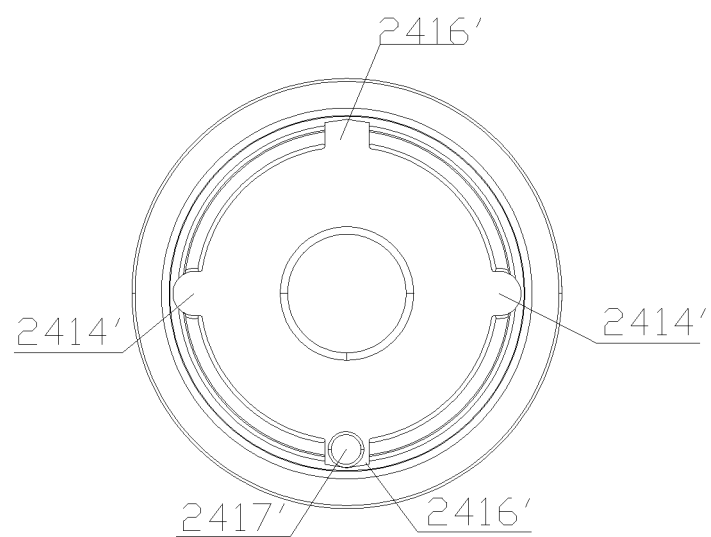
FIG. 13 is a schematic structural view of the connecting seat according to the second embodiment from a top perspective.

In this embodiment, in order to facilitate of processing and installation, the communicating part 2416 and the positioning part 2414 have same structure, each of which is a semi-cylindrical concave part and the number of which is two, that is, there are four concave parts, which are distributed along the circumference and symmetrical about the axis two-to-two. Since the communicating part 2416 and the positioning part 2414 have the same structure, when two concave parts symmetrical about the axis are fitted with the matching part 2222 of the fixed ring gear 222 to serve as positioning parts, the remaining two concave parts symmetrical about the axis can serve as communicating parts to realize the communication function. Of course, the structures of the communicating part and the positioning part can also be different, for example, the communicating part may be in a rectangular shape, the positioning part may be in form of a semi-cylindrical concave part, and the matching part is a semi-cylindrical protrusion, where the positioning part and the matching part are mutually fitted and positioned Referring to FIG. 12 to FIG. 13, FIG. 12 is a schematic cross-sectional structural view of the second embodiment of the valve component of the electric valve. Different from the first embodiment, in this embodiment, the communicating hole 2417' is arranged below the communicating part 2416', and the passage includes the communicating part 2416' and the communicating hole 2417'. The passage communicates the sleeve chamber and the valve body chamber, and the powder impurities accumulated in the sleeve chamber can enter the rotor chamber and the valve body chamber which are in communication with the sleeve chamber through the passage. In the case that it is allowed by the structure of the connecting seat 24', it can be arranged as shown in this embodiment. Since the bottom part of the connecting seat needs to be provided with a sealing ring to prevent the working medium from leaking, if the connecting seat shown in FIG. 1 is provided with a communicating hole below the communicating part, the mounting position of the sealing ring is insufficient, so it is necessary to make some adjustments to the structure of the bottom part of the connecting seat or the position of the sealing ring, such as widening the diameter of the bottom part of the connecting seat, and the structure of the corresponding valve body assembly also needs to be adjusted. The adjusted structure of the valve body assembly and the position of the sealing ring will not be described in this embodiment, and relevant technicians can design and adjust by themselves.

Referring to FIG. 13, FIG. 13 is a schematic structural view of the connecting seat according to the second embodiment from a top perspective. Different from the first embodiment, in this embodiment, the communicating part 2416' and the positioning part 2414' are different in structure. The communicating part 2416' is a substantial rectangular concave part, and the positioning part 2414' is still the same semi-cylindrical concave part with the previous embodiment. The corresponding matching part of the ring gear is a semi-cylindrical protrusion, and the positioning part 2414' is positioned with the matching part, so that the design can perform a fool-proofing function to avoid assembly errors.

It should be noted that, the above embodiments are only used to illustrate the present application rather than limit the technical solutions described in the present application. Although the present application is described in detail in this specification with reference to the above embodiments, those of ordinary skilled in the art should understand that those skilled in the art may still modify or equivalently replace the present application, and all technical solutions and improvements thereof that do not depart from the spirit and scope of the present application shall be covered within the scope of the claims of the present application.

The invention claimed is:

1. An electric valve, comprising a valve component, a valve body assembly and a valve core, wherein the valve component comprises a sleeve, a transmission mechanism and a connecting seat; the sleeve is provided with a sleeve chamber, in which the transmission mechanism is at least partially arranged, and the sleeve is connected with the connecting seat;

wherein a valve body chamber is formed in the electric valve, the valve core is arranged in the valve body chamber, and the valve core is in transmission connection with the transmission mechanism; the valve body assembly is connected with the connecting seat;

wherein the transmission mechanism comprises a fixed ring gear and a planetary gear set, the planetary gear set is at least partially arranged inside the fixed ring gear; the connecting seat is provided with an accommodating chamber, in which the fixed ring gear is at least partially arranged, and part of the fixed ring gear abuts against the connecting seat;

wherein the electric valve is provided with a passage, part of which is arranged between the connecting seat and the fixed ring gear and part of which is arranged at the connecting seat, and the passage communicates the sleeve chamber with the valve body chamber;

wherein the connecting seat has a through hole through which the transmission mechanism is connected to the valve core, a communicating part and a communicating hole, the communicating part is arranged at one side, close to the fixed ring gear, of the connecting seat and is arranged along an axial direction of the connecting seat; and wherein the communicating hole is arranged along the axial direction of the connecting seat and penetrates through the connecting seat.

2. The electric valve according to claim 1, wherein a gap is provided between a lower end face of the fixed ring gear and the connecting seat, and a lower end face of the communicating part is closer to the valve core than the lower end face of the fixed ring gear is; and wherein the communicating part is in communication with the communicating hole through the gap between the lower end face of the fixed ring gear and the connecting seat, and the passage comprises the communicating part, the gap between the lower end face of the fixed ring gear and the connecting seat, and the communicating hole.

3. The electric valve according to claim 2, wherein the communicating hole is arranged below the communicating part in communication with the communicating hole.

4. The electric valve according to claim 2, wherein the connecting seat comprises a first step part and a second step part, which is closer to the valve core than the first step part is; the fixed ring gear has a first flange part, a lower surface of which abuts against the first step part; the lower end face of the communicating part is arranged below the upper end face of the first step part; and wherein the communicating part is a concave part so that a preset gap is provided between the connecting seat at the communicating part and the outer peripheral surface of the first flange part.

5. The electric valve according to claim 4, wherein the communicating hole extends through the second step part along the axial direction, and a gap is provided between the lower end face of the fixed ring gear and the upper end face of the second step part, and wherein the passage comprises the communicating part, the gap between the lower end face of the fixed ring gear and the upper end face of the second step, and the communicating hole.

6. The electric valve according to claim 4, wherein the connecting seat comprises a positioning part and a crimping part, where the positioning part is arranged at the inner periphery of the connecting seat, and the number of the positioning part is two or more; the crimping part is arranged at the upper part of the connecting seat; the fixed ring gear comprises a matching part, which is arranged at the outer periphery of the first flange part, and the number of the matching part is as same as that of the positioning part; and wherein the matching part is fitted with the positioning part, and the connecting seat is fixedly connected to the fixed ring gear by crimping.

7. The electric valve according to claim 5, wherein the positioning part is a concave part, and the matching part is a protrusion matched with the positioning part; or the positioning part is a protrusion, and the matching part is a concave part matched with the positioning part.

8. The electric valve according to claim 4, wherein the planetary gear set comprises an output planetary carrier, and the electric valve further comprises a valve rod, where the output planetary carrier is fixedly connected with the valve rod or is formed with the valve rod by injection molding; the output planetary carrier is at least partially arranged in the accommodating chamber of the connecting seat; the output planetary carrier abuts against the second step part; and wherein the through hole is axially arranged, and the valve rod is connected with the valve core through the through hole.

9. The electric valve according to claim 5, wherein the planetary gear set comprises an output planetary carrier, and the electric valve further comprises a valve rod, where the output planetary carrier is fixedly connected with the valve rod or is formed with the valve rod by injection molding; the output planetary carrier is at least partially arranged in the accommodating chamber of the connecting seat; the output planetary carrier abuts against the second step part; and Wherein the through hole is axially arranged, and the valve rod is connected with the valve core through the through hole.

10. The electric valve according to claim 2, wherein the connecting seat comprises a main body part and a second flange part, the second flange part extends outward from the outer periphery of the side wall of the main body part in the radial direction; and the electric valve further comprises a compression nut, which is sleeved on the radial outer periphery of the side wall of the main body part, abuts against the upper surface of the second flange part, and is in threaded connection with the valve body assembly; and wherein the communicating part and the communicating hole are arranged at the inner periphery of the side wall of the main body part.

11. The electric valve according to claim 4, wherein the connecting seat comprises a main body part and a second flange part, where the second flange part extends outwards from the outer periphery of the side wall of the main body part in the radial direction, and the electric valve further comprises a compression nut which is sleeved on the radial outer periphery of the side wall of the main body part, abuts against the upper surface of the second flange part, and is in threaded connection with the valve body assembly; and wherein the communicating part and the communicating hole are arranged at the inner periphery of the side wall of the main body part.

12. The electric valve according to claim 10, wherein the valve core has a pore passage, and the valve body assembly has a first flow passage and a second flow passage; and wherein the pore passage is configured to communicate or block the first flow passage with the second flow passage by rotating the valve core.

13. The electric valve according to claim 3, wherein the connecting seat comprises a first step part and a second step part, which is closer to the valve core than the first step part is; the fixed ring gear has a first flange part, a lower surface of which abuts against the first step part; the lower end face of the communicating part is arranged below the upper end face of the first step part; and wherein the communicating part is a concave part so that a preset gap is provided between the connecting seat at the communicating part and the outer peripheral surface of the first flange part.

14. The electric valve according to claim 2, wherein the connecting seat comprises a main body part and a second flange part, the second flange part extends outward from the outer periphery of the side wall of the main body part in the radial direction; and the electric valve further comprises a compression nut, which is sleeved on the radial outer periphery of the side wall of the main body part, abuts against the upper surface of the second flange part, and is in threaded connection with the valve body assembly; and wherein the communicating part and the communicating hole are arranged at the inner periphery of the side wall of the main body part.

15. The electric valve according to claim 3, wherein the connecting seat comprises a main body part and a second flange part, the second flange part extends outward from the outer periphery of the side wall of the main body part in the radial direction; and the electric valve further comprises a compression nut, which is sleeved on the radial outer periphery of the side wall of the main body part, abuts against the upper surface of the second flange part, and is in threaded connection with the valve body assembly; and wherein the communicating part and the communicating hole are arranged at the inner periphery of the side wall of the main body part.

16. The electric valve according to claim 5, wherein the connecting seat comprises a main body part and a second flange part, the second flange part extends outward from the outer periphery of the side wall of the main body part in the radial direction; and the electric valve further comprises a compression nut, which is sleeved on the radial outer periphery of the side wall of the main body part, abuts against the upper surface of the second flange part, and is in threaded connection with the valve body assembly; and wherein the communicating part and the communicating hole are arranged at the inner periphery of the side wall of the main body part.

17. The electric valve according to claim 6, wherein the connecting seat comprises a main body part and a second flange part, the second flange part extends outward from the outer periphery of the side wall of the main body part in the radial direction; and the electric valve further comprises a compression nut, which is sleeved on the radial outer periphery of the side wall of the main body part, abuts against the upper surface of the second flange part, and is in threaded connection with the valve body assembly; and wherein the communicating part and the communicating hole are arranged at the inner periphery of the side wall of the main body part.

18. The electric valve according to claim 7, wherein the connecting seat comprises a main body part and a second flange part, the second flange part extends outward from the outer periphery of the side wall of the main body part in the radial direction; and the electric valve further comprises a compression nut, which is sleeved on the radial outer periphery of the side wall of the main body part, abuts against the upper surface of the second flange part, and is in threaded connection with the valve body assembly; and wherein the communicating part and the communicating hole are arranged at the inner periphery of the side wall of the main body part.

19. The electric valve according to claim 8, wherein the connecting seat comprises a main body part and a second flange part, the second flange part extends outward from the outer periphery of the side wall of the main body part in the radial direction; and the electric valve further comprises a compression nut, which is sleeved on the radial outer periphery of the side wall of the main body part, abuts against the upper surface of the second flange part, and is in threaded connection with the valve body assembly; and wherein the communicating part and the communicating hole are arranged at the inner periphery of the side wall of the main body part.

* * * * *